United States Patent

Williams et al.

[15] 3,649,243

[45] Mar. 14, 1972

[54] BENEFICIATING IRON-CONTAINING TITANIFEROUS MATERIAL

[72] Inventors: Frank Ronald Williams, Yarm; Jack Whitehead, Acklam; Jefferson Marshall, Stockton-on-Tees; Alan Conners, Balcombe; Derek Vernon Gosden, Horsham, all of England

[73] Assignee: British Titan Products Company Limited, Billingham, Teesside, England

[22] Filed: July 31, 1970

[21] Appl. No.: 60,122

[30] Foreign Application Priority Data

July 31, 1969 Great Britain......................38,478/69

[52] U.S. Cl..........................................75/1, 75/101, 75/114
[51] Int. Cl....................................C22b 3/00, C22b 53/00
[58] Field of Search.......................................75/1, 114, 101

[56] References Cited

UNITED STATES PATENTS

| 2,183,365 | 12/1939 | Booge | 75/1 X |
| 2,406,577 | 8/1946 | Alessandroni et al. | 75/114 X |
| 2,758,019 | 8/1956 | Daubenspeck et al. | 75/1 |
| 3,105,755 | 10/1963 | Green | 75/1 |
| 3,193,376 | 7/1965 | Lo | 75/114 X |
| 3,457,037 | 7/1969 | Aramendia et al. | 75/101 R X |

*Primary Examiner*—Allen B. Curtis
*Attorney*—Birch, Swindler, McKie & Beckett

[57] ABSTRACT

A process for the beneficiation of iron-containing titaniferous material by a preliminary oxidation and reduction before leaching with aqueous hydrochloric acid wherein the leaching is carried out in two stages, in one stage with acid containing dissolved titanium and in the other stage with fresh acid.

17 Claims, 1 Drawing Figure

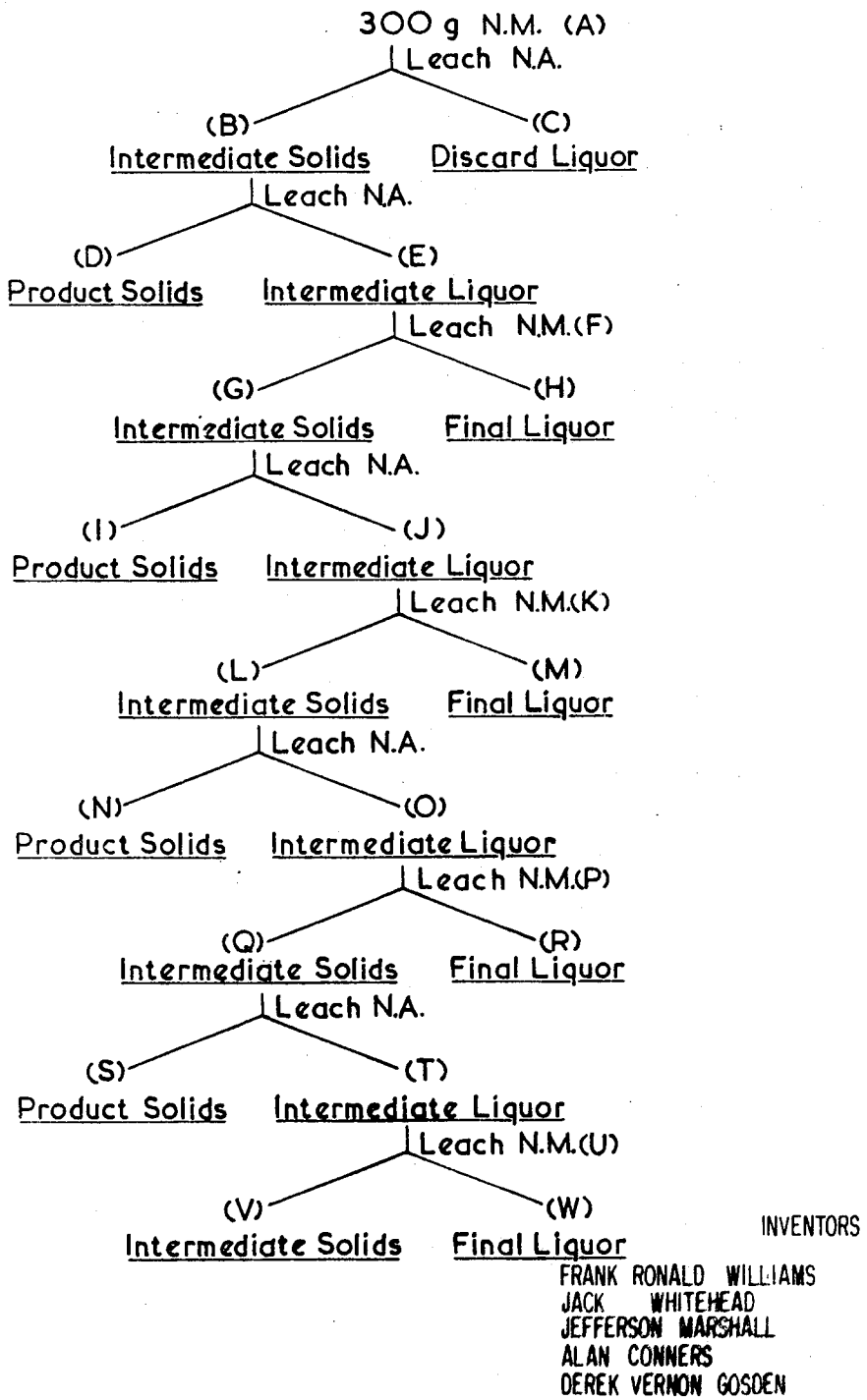

BENEFICIATING IRON-CONTAINING TITANIFEROUS MATERIAL

The present invention relates to the beneficiation of iron-containing titaniferous materials such as ilmenites or leucoxenes.

It has been found desirable, when beneficiating iron-containing titaniferous materials to preheat the material under oxidizing conditions to ensure that the iron content is in the ferric state and thereafter to reduce the iron substantially wholly to the ferrous state. By this means the iron content of the material is rendered more reactive when contacted with a mineral acid such as aqueous hydrochloric acid (when the iron content is removed as a solution of ferrous chloride which is particularly suitable for conversion to finely divided iron via reduction of solid ferrous chloride dihydrate or to finely divided iron oxide). The hydrochloric acid may be recovered from such material, for example, by the Aman process (as described in British Pat. No. 793,700).

During the leaching step, it is important on a commercial scale to remove as much as possible of the iron content from, and to recover as much as possible of the titanium dioxide content in, the final solid product. This is particularly true if the beneficiated product is to be used in the production of titanium tetrahalides such as titanium tetrachloride by halogenation, for example in a fluidized bed.

It is an object of the present invention to achieve these aims.

Accordingly, the present invention is a process which comprises heating a finely divided, iron-containing titaniferous material under oxidizing conditions to convert the iron content to the ferric state, reducing the iron content substantially wholly to the ferrous state and thereafter separately contacting the material with aqueous hydrochloric acid containing dissolved titanium and with fresh aqueous acid to leach out the iron content of the material before recovering finely divided solid material containing an increased proportion of titanium dioxide.

The starting material for the present process may be, for example an ilmenite or a leucoxene and is preferably the former. Such materials usually contain between about 5 and 55 percent of iron (as FeO).

It is preferred that the starting material should have an average mean weight particle size in the range of about 50 to $300\mu$ and particularly one in the range 100 to $200\mu$.

The material may be heated, for example, to a temperature in the range 850° to 950° C. in an oxidizing atmosphere such as air for a sufficient length of time to convert substantially all the iron content to the ferric state. This may be accomplished, in a rotating kiln or in a fluidized bed or in other suitable device.

After oxidation the iron content of the material is reduced until it is substantially wholly in the ferrous state, i.e., not more than about 2 percent of the iron content should be present as ferric iron or as metallic iron.

The reducing agent may be solid carbon but is preferably a gaseous reducing agent such as hydrogen (with or without the introduction of a minor proportion of steam), a hydrocarbon containing from one to four carbon atoms, particularly methane as described, for example, in our copending applications.

The reduction is conveniently carried out at a temperature in the range 600° to 1,100° C. and particularly at one in the range 700° to 900° C.

Any suitable apparatus may be used for the reduction but it is again preferred to utilize a fluidized bed or a rotating kiln.

After reduction the material is subjected to a two stage leaching in which the reduced material is separately contacted with suitable quantities of aqueous hydrochloric acid, one of which contains dissolved titanium.

Preferably, the first leach is carried out using aqueous hydrochloric acid which has been used to leach a preceding batch of reduced iron-containing titaniferous material. Such once-used acid contains dissolved titanium (and iron) and has the advantage that it dissolves less titanium when used as a first leaching liquid of a new batch of reduced iron-containing titaniferous material. Normally, the acid contains an amount of titanium in the range of about 0.01 to 2.0 percent and particularly from 0.2 to 2.0 percent by weight (estimated as $TiO_2$) and an amount of iron in the range of about 10 to 20 percent by weight (estimated as FeO).

A stoichiometric excess of acid (based on the iron content of the reduced material) is preferably used, for example 20 to 30 percent excess, and the leaching is carried out at an elevated temperature, for example at a temperature in the range 80° C. to that of the boiling point of the acid since such temperatures also assist significantly in reducing the amount of titanium which is rendered soluble during leaching. The leaching may also be carried out under superatmospheric pressure, if desired.

The solid material is then separated from the suspension, for example after a period of 30 to 300 minutes, and is then conveniently contacted with a similar amount of acid, e.g., 20 to 30 percent stoichiometric excess based on the iron content of the material at similar temperatures until substantially all the iron content has been removed. This leach is preferably carried out with fresh aqueous hydrochloric acid (which can then conveniently be reused in the first leaching stage of a subsequent batch of reduced iron-containing titaniferous material).

The aqueous hydrochloric acid used may be of any strength which will leach out the iron content of the material in a commercially acceptable time but it is preferred to use acid containing from 18 to 22 percent by weight of HCl, at least when leaching with fresh acid. The $TiO_2$ content of the intermediate solid product of the two stage leaching process is normally in the range 75 to 85 percent.

After treatment by the process of the present invention the solid product (which may be recovered by filtration; by the use of a centrifuge or by decantation) generally has a titanium content (estimated as $TiO_2$) of at least 90 percent and normally of at least 95 percent and preferably of at least 96 percent and is very suitable, particularly after a calcination step, for chlorination in a fluidized bed to titanium tetrachloride.

It has been found that mechanical agitation during the leaching stages is most undesirable since it leads to breakdown of the leached particles, thereby rendering at least some of them difficult to recover and of unsuitable size for halogenation, at least in a fluidized bed.

Consequently, agitation (which is normally necessary for adequate leaching) may conveniently be provided by passing a suitable gas, for example nitrogen or other inert gas, through the suspension of solids in liquid.

It has also been found particularly convenient to contact the reduced iron-containing titaniferous material with acid in a fluidized column in which the acid is passed upwardly through the column thereby contacting and fluidizing the material in the column. The acid used in such a process is normally recycled through the column a number of times before being used for leaching a subsequent batch of reduced material, or discarded, as desired.

In the following examples, Example 1 describes a process of the present invention using a fluidized column for leaching. Example 2 describes a process not according to the present invention into which the material is subjected, under conditions similar to those in Example 1, to a single leaching stage only.

EXAMPLE 1

Three hundred-gram portions of an ilmenite containing 56.5 percent titanium (expressed as $TiO_2$) and 40.7 percent iron (expressed as FeO) which had been oxidized and reduced to ferrous iron at 875° C. were taken and treated as indicated at A, F, D, P and U in the flow sheet shown in the FIGURE accompanying this specification.

The material was contacted with the acid in the leaching steps in a column up which was passed aqueous hydrochloric acid at a rate of 10 ml./sec. This was collected from the top of the column and recirculated through the column for 60 minutes.

The fresh acid (designated as leach N.A.) was constant boiling acid (at atmospheric pressure) and both fresh and once-used acid were circulated at a temperature of 100° C.

Sufficient fresh acid was used at each stage to provide a 20 percent stoichiometric excess (based on the iron content of the starting material).

The titanium content as soluble and insoluble $TiO_2$ was estimated for the Discard Liquor (C) and the Final Liquors H, M, R and V (also with the HCl content) and the titanium and iron content (expressed as $TiO_2$ and FeO respectively) of the Product Solids D, I, N and S and Intermediate Solids were also estimated. The $TiO_2$ content of Q is given as a typical value for the Intermediate Solids. The results are given in the Table below:

TABLE

| Discard liquor (C): | | | |
|---|---|---|---|
| Soluble $TiO_2$, g./l | | | 5.6 |
| Insoluble $TiO_2$, g./l | | | 5.5 |
| Total Fe, g./l | | | 76.5 |

| Product solids | Weight, g. | $TiO_2$, percent | Fe, percent |
|---|---|---|---|
| Stage D | 153 | 96.3 | 0.35 |
| Stage I | 168 | 96.1 | 0.39 |
| Stage N | 170 | 96.8 | 0.62 |
| Stage S | 166.5 | 96.0 | 0.78 |

| Intermediate solids (Q): | | | |
|---|---|---|---|
| $TiO_2$, percent | | | 81.2 |
| Weight, g | | | 208.2 |

| Final liquor, g./l. | Sol. $TiO_2$ | Insol. $TiO_2$ | HCl |
|---|---|---|---|
| Stage H | 0.69 | 3.27 | 5.0 |
| Stage M | 0.63 | 3.81 | 5.4 |
| Stage R | 2.19 | 6.90 | 5.5 |
| Stage W | 0.39 | 3.00 | 6.2 |

EXAMPLE 2

Three hundred grams of an ilmenite containing 56.5 percent titanium (expressed as $TiO_2$) and 40.5 percent iron (expressed as FeO) which had been oxidized and reduced at 875° C. were leached for 2 hours at 100° C. in a vessel with 20 percent stoichiometric excess of constant boiling aqueous hydrochloric acid. Agitation was provided by bubbling nitrogen through the mixture.

The leached material was then recovered and analyzed for titanium and iron.

The product contained only 89.3 percent titanium (expressed as $TiO_2$) and 4.8 percent iron (expressed as FeO). These figures should be compared with those for the Product Solids shown in the Table of Example 1 (96 percent to 96.8% $TiO_2$ and 0.35% to 0.78% FeO).

What is claimed is

1. A process comprising heating a finely divided iron-containing titaniferous material under oxidizing conditions to convert the iron content to the ferric state, reducing the iron content substantially wholly to the ferrous state and thereafter separately contacting the material with aqueous hydrochloric acid containing dissolved titanium and with fresh aqueous acid to leach out the iron content before recovering finely divided solid material containing an increased proportion of titanium dioxide.

2. A process as claimed in claim 1 wherein the finely divided iron-containing material has an average mean weight particle size in the range of about 50 to 300μ.

3. A process as claimed in claim 2 wherein the particle size is in the range 100 to 200μ.

4. A process as claimed in claim 1 wherein the finely divided iron-containing titaniferous material is heated under oxidizing conditions to a temperature in the range 850° to 950° C.

5. A process as claimed in claim 1 wherein the finely divided, iron-containing titaniferous material is heated under reducing conditions to a temperature in the range 600° to 1,100° C.

6. A process as claimed in claim 5 wherein the material is heated to a temperature in the range 700° to 900° C.

7. A process as claimed in claim 1 wherein the reduced material is first leached with aqueous hydrochloric acid containing dissolved titanium and secondly with fresh acid.

8. A process as claimed in claim 1 wherein the titanium-containing aqueous hydrochloric acid contains an amount of titanium in the range 0.01 to 2 percent by weight expressed as $TiO_2$.

9. A process as claimed in claim 8 wherein the amount of titanium, expressed as $TiO_2$, in the acid is in the range 0.2 to 2 percent by weight.

10. A process as claimed in claim 1 wherein sufficient aqueous hydrochloric acid is used to provide a 20 to 30 percent stoichiometric excess based on the iron content of the material to be leached.

11. A process as claimed in claim 1 wherein the leaching is carried out at a temperature in the range 80° C. to the boiling point of the acid.

12. A process as claimed in claim 1 in which the oxidized and reduced material is leached, in at least one stage, for a period of from 30 to 300 minutes.

13. A process as claimed in claim 1 wherein fresh acid, after leaching, is used as the titanium-containing acid for leaching a subsequent quantity of oxidized and reduced iron-containing titaniferous material.

14. A process as claimed in claim 1 wherein the aqueous hydrochloric acid contains from 18 to 22 percent by weight of HCl.

15. A process as claimed in claim 1 wherein the titaniferous material is agitated, during leaching, by passing a suitable gas through the suspension of solids in the liquid.

16. A process as claimed in claim 1 wherein the acid is passed upwardly through a column of titaniferous material during leaching.

17. A process as claimed in claim 16 wherein the acid is recycled through the column.

* * * * *